United States Patent
Ondrasik

[19]

[11] Patent Number: 6,126,181

[45] Date of Patent: Oct. 3, 2000

[54] SHOPPING CART WITH STEPPED BASKETS

[76] Inventor: V. John Ondrasik, 6150 Sheila St., Los Angeles, Calif. 90040-2407

[21] Appl. No.: 09/112,964

[22] Filed: Jul. 9, 1998

[51] Int. Cl.⁷ ....................................................... B62B 3/14
[52] U.S. Cl. ................................ 280/33.991; 280/33.997; 280/47.35
[58] Field of Search ......................... 280/33.993, 33.995, 280/33.998, 47.35, 33.991, 33.997, 35, 33.996, 47.25

[56] References Cited

U.S. PATENT DOCUMENTS

| | | | |
|---|---|---|---|
| Re. 32,453 | 7/1987 | Stover et al. | 280/33.993 |
| 2,133,834 | 10/1938 | Sheldon | 280/47.35 |
| 2,212,053 | 8/1940 | Smith . | |
| 2,443,236 | 6/1948 | Gallagher | 280/47.35 |
| 2,479,530 | 8/1949 | Watson | 280/33.991 |
| 2,615,726 | 10/1952 | Brottman | 280/47.35 |
| 2,837,344 | 6/1958 | Young | 280/33.993 |
| 2,890,057 | 6/1959 | Davis | 280/33.993 |
| 2,901,262 | 8/1959 | Berlin | 280/641 |
| 2,998,978 | 9/1961 | Sides | 280/33.993 |
| 3,047,304 | 7/1962 | Kampf | 280/33.995 |
| 3,052,484 | 9/1962 | Huffman et al. | 280/654 |
| 3,309,100 | 3/1967 | Barbuti | 280/33.996 |
| 3,885,806 | 5/1975 | Trubiano | 280/33.993 |
| 4,381,870 | 5/1983 | Muellner | 280/33.993 |
| 5,203,578 | 4/1993 | Davidson et al. . | |
| 5,330,210 | 7/1994 | Lambrecht | 280/33.993 |
| 5,435,582 | 7/1995 | Davidson . | |
| 5,507,507 | 4/1996 | Davidson . | |
| 5,544,904 | 8/1996 | Maher | 280/47.35 |
| 5,595,394 | 1/1997 | Adamson | 280/33.993 |
| 5,865,449 | 2/1999 | Castaneda | 280/33.996 |

FOREIGN PATENT DOCUMENTS

| | | |
|---|---|---|
| 267817 | 5/1988 | European Pat. Off. . |
| 661981 | 11/1951 | United Kingdom . |

*Primary Examiner*—Brian L. Johnson
*Assistant Examiner*—Bridget Avery
*Attorney, Agent, or Firm*—Brown, Martin, Haller & McClain, LLP

[57] ABSTRACT

A shopping cart has a wheeled base, a frame projecting upwardly from the base, the frame having a lower portion and an upper portion stepped rearwardly from the lower portion, a first basket projecting forwardly from the lower portion of the frame, and a second basket projecting forwardly from the upper portion of the frame. The rear wall of the lower basket is fixed in position, and carts can be nested together by positioning the lower basket of a first cart beneath the upper basket of a second cart, with no moving parts required for nesting.

9 Claims, 3 Drawing Sheets

SHOPPING CART WITH STEPPED BASKETS

BACKGROUND OF THE INVENTION

The present invention relates generally to shopping carts, and is particularly concerned with a shopping cart having improved nesting ability.

Shopping carts typically have a wheeled base and an upright frame with a handle, and a basket projecting forwardly from the frame for receiving items to be purchased. A pivoted gate at the rear end of the basket allows a series of carts to be nested for storage purposes, with the forward end of one basket pushed into the rear end of another basket via the pivoted gate. The base also has a pivoting lower tray for permitting nesting of the base of one cart into the base of the cart in front. The moving parts on these conventional carts cause rattling and significant amounts of noise when wheeling a cart around a store. Additionally, they are liable to jam and malfunction after repeated use, causing carts to lock together such that customers cannot easily separate them when required for use.

U.S. Pat. Nos. 5,435,582 and 5,507,507 of Davidson both describe shopping carts with a wheeled base having a pivoted and stepped support rack, an upper basket, and a lower basket stepped forwardly from the upper basket. Each of the baskets has a conventional pivoted rear wall for nesting purposes, so these carts are subject to the same noise and rattling problems as conventional one basket carts.

SUMMARY OF THE INVENTION

It is an object of the present invention to provide a new and improved shopping cart which is less noisy during use and which can be both nested and released from nesting more readily than conventional carts.

According to the present invention, a shopping cart is provided which comprises a wheeled base having a forward end and a rear end, a frame projecting upwardly from the base, the frame having a lower portion and an upper portion stepped rearwardly from the lower portion, a first basket projecting forwardly from the lower portion of the frame, and a second basket projecting forwardly from the upper portion of the frame, each basket having a front wall and a rear wall, and the rear wall of at least the lower basket being fixed with no moving parts, whereby carts can be nested together by positioning the lower basket of a first cart beneath the upper basket of a second cart.

For maximum nesting ability, the upper basket preferably has a front wall substantially aligned with the rear wall of the lower basket. Additionally, the upper and lower baskets are preferably of substantially equal length, so that the lower basket of a first or rear cart can be nested completely beneath the upper basket of a second or forward cart. The upper basket may be provided with a rear facing child seat, if desired, or the lower basket may have a built-in, forward facing child seat. However, neither the upper nor the lower basket has a pivoted rear wall, since nesting of the baskets of one cart into the baskets of another cart is not necessary. The lower tray of each cart is preferably also stepped, with two or more different levels, the lowest level being at the forward end and the highest level at the rear, and the forward portion of the base of one cart is nested under the rear portion of the base of the second cart as the baskets are nested. The stepped lower trays prevent the carts from nesting completely together.

This stepped nesting arrangement of both the baskets and the base eliminates all moving parts for nesting, and nesting is achieved without any movement of walls or parts of the cart. This reduces the risk of carts becoming locked or jammed together, and also substantially reduces noise as individual carts are wheeled around a store. Another advantage is that two or more carts can be nested together even when loaded, since there is no nesting of one basket into another. Thus, customers can use two or more carts simultaneously for large amounts of shopping, while individual carts are more compact and easy to maneuver. The elimination of the conventional moving parts normally needed for nesting will also substantially reduce cart maintenance requirements,

BRIEF DESCRIPTION OF THE DRAWINGS

The present invention will be better understood from the following detailed description of some preferred embodiments of the invention, taken in conjunction with the accompanying drawings in which like reference numerals refer to parts and in which.

DESCRIPTION OF THE PREFERRED EMBODIMENT

Figure 1:
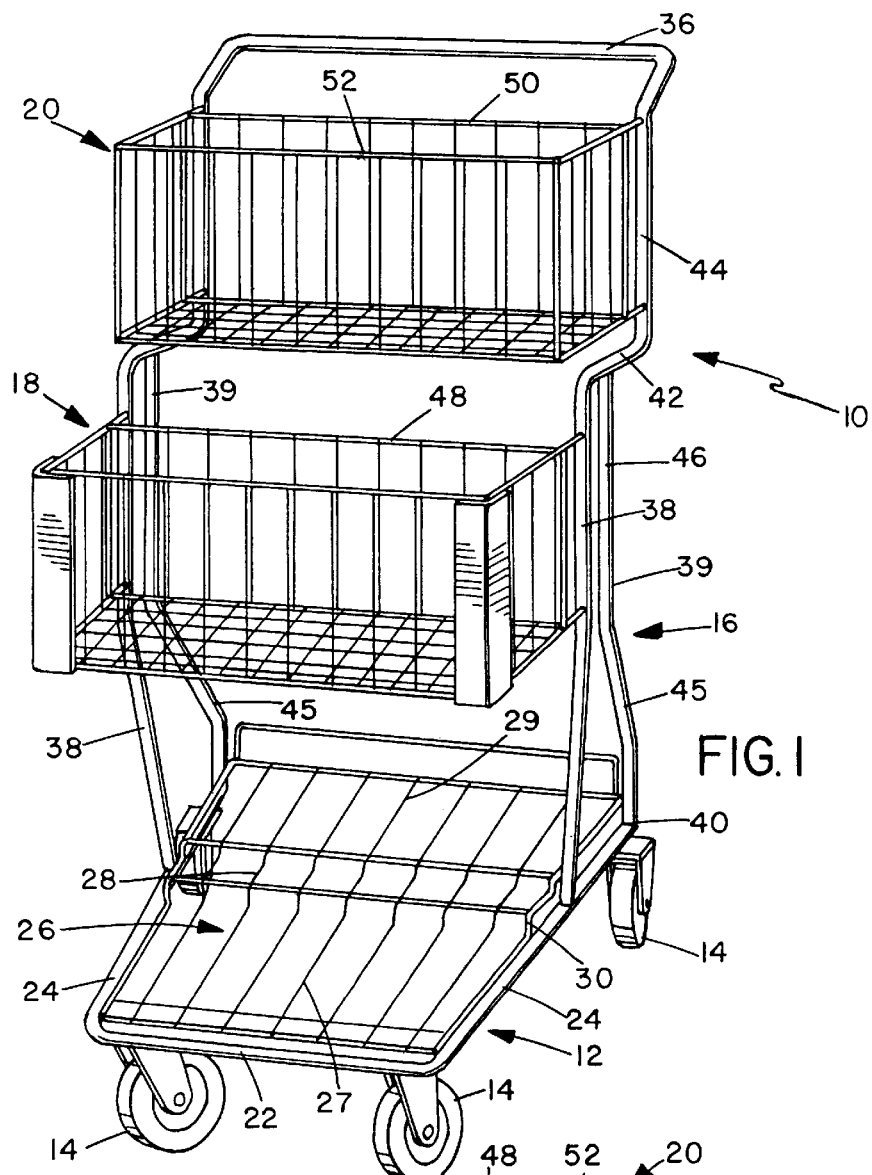
FIG. 1 is a perspective view of the cart according to a first embodiment of the invention.
Figure 2:
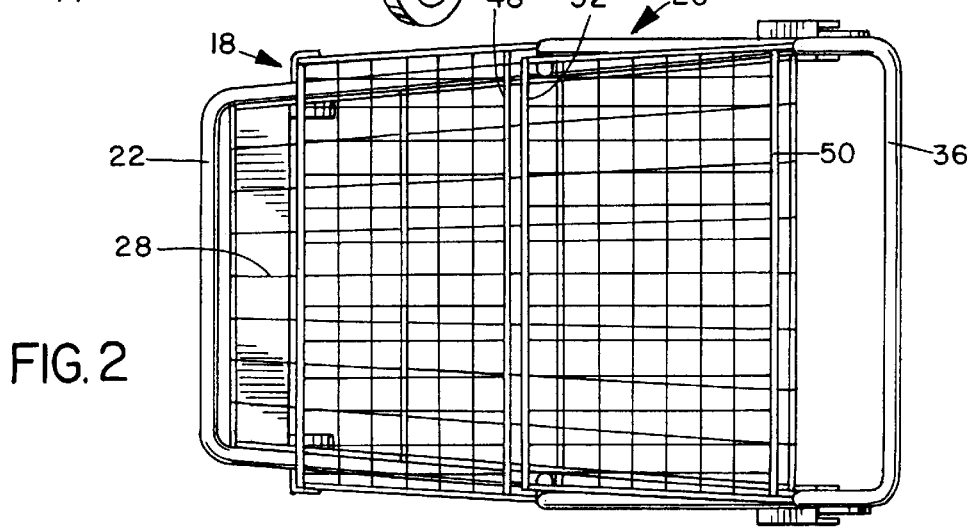
FIG. 2 is a top view of the cart.
Figure 3:
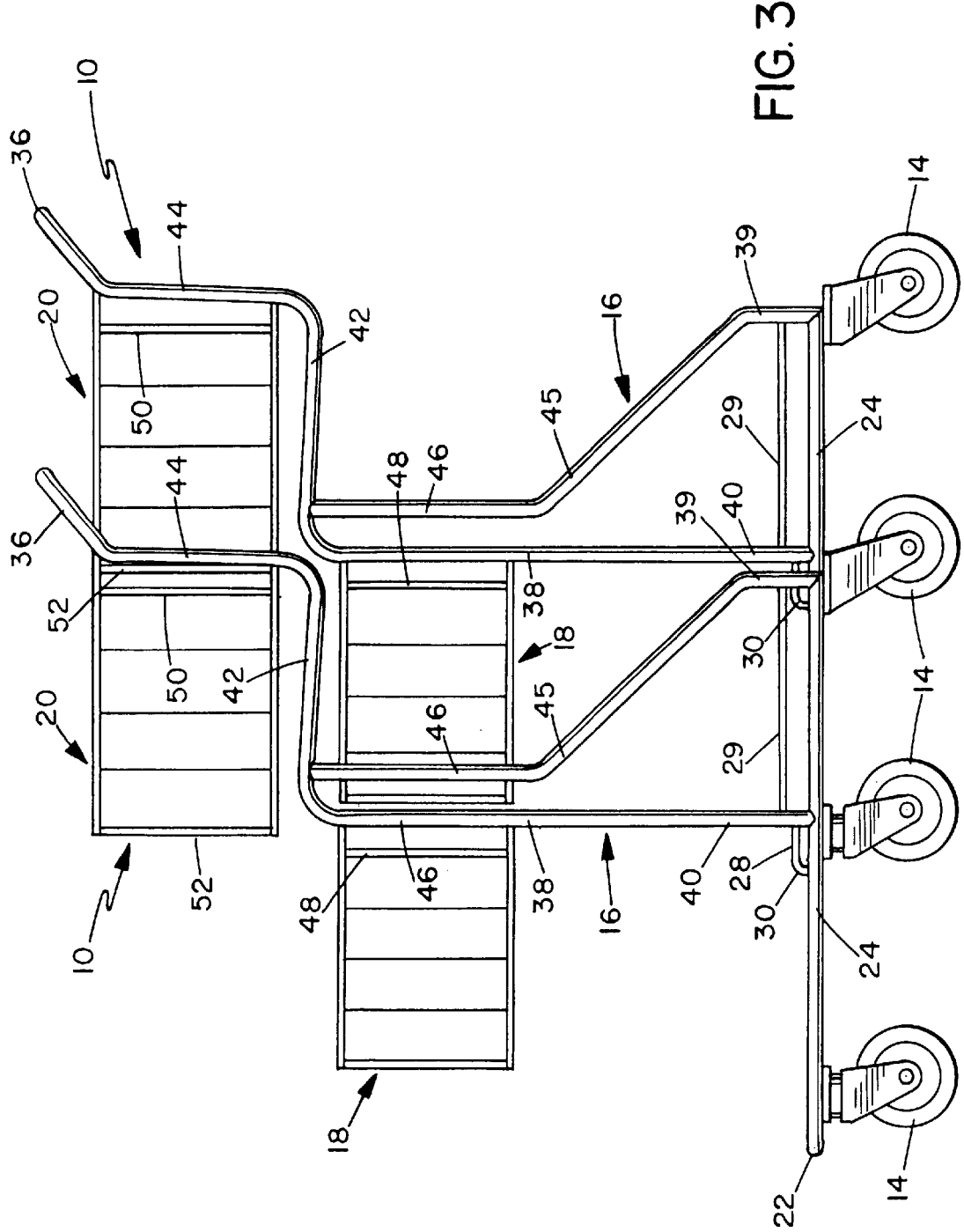
FIG. 3 is a side view of two nested carts.

FIGS. 1 to 3 of the drawings illustrate a shopping cart 10 according to a preferred embodiment of the invention. Cart 10 has a base or lower tray 12 with four conventional shopping cart wheels 14, a frame 16 projecting upwardly from the base, and two baskets 18,20 projecting forwardly at different heights from frame 16.

The base 12 has a peripheral support rod or bar 22 which is generally U-shaped and open at the rear end of the cart, with outwardly tapering sides 24. A support platform or tray of wire grille or latticework construction is secured across the base. The platform preferably has at least two different levels, with the lowermost level at the front. In the preferred embodiment, a series of three different levels 27,28,29 is provided, with a step 30 between each pair of levels.

Frame 16 has opposite sides projecting upwardly from opposite sides of the support rod 22, and a handle bar 36 extending between the opposite sides at the upper end of the frame. As best illustrated in FIG. 3, each side of the frame has a first bar or rod 38 projecting upwardly from an intermediate point along the length of the respective side 24 of the base support rod, and a second rod 39 projecting upwardly from the rear end of side 24. Rod 38 has a first, lower portion 40 which extends substantially vertically upwards, a stepped portion 42 extending rearwardly, and an upper portion 44 projecting vertically upwardly from the rear end of portion 42. Handle bar 36 connects the upper ends of the two portions 44. Rod 39 provides added support, and has a forwardly inclined portion 45, and an upwardly projecting portion 46 which is connected to the stepped portion 42 of rod 38. Both the frame 16 and the base support rod 22 may be of metal tube, and of either square or circular cross-section.

The lower basket 18 has a rear end secured to the upper ends of the lower vertical portions 40 of each of the frame side bars 38, so that it projects forwardly from portions 40. Similarly, the upper basket 20 has a rear end secured to the upper vertical portions 44 of each of the frame side bars 38, and projects forwardly over the stepped portion 42. Each basket is of wire grille or latticework construction. Preferably, the two baskets are of substantially equal dimensions, and the forward end wall 52 of the upper basket is substantially aligned with the rear end wall 48 of the lower basket. This provides the most compact nesting arrangement, although other dimensions and arrangements may be used, for example to provide a larger basket area.

The lower basket 18 has no moving parts and the rear end wall 48 is fixed. The upper basket 20 may also have no moving parts, or alternatively may have a conventional, rear-facing child seat (not illustrated) built in to the rear wall 50. The basket as illustrated in FIGS. 1 to 3 has no moving parts apart from the wheels 14, and will therefore be very quiet when wheeled around a store or store parking lot, with none of the rattling typically associated with conventional carts having moving parts for nesting.

Two or more carts 10 can be easily nested together as illustrated in FIG. 3. The rear cart is simply pushed into the rear of the forward cart, with the stepped base portions and stepped baskets nesting together as illustrated. The lower stepped portions of the rear cart will nest under the raised, rear portion 29 of the base of the forward cart, while the lower basket 18 of the rear cart will simultaneously engage beneath the upper basket 20 of the forward cart. The positions and dimensions of the two baskets are preferably such that the forward ends of the lower and upper baskets of the rear cart are located close to the rear ends of the respective baskets of the forward cart, to provide the most compact nesting arrangement. This is achieved by making the upper and lower basket of substantially equal length and aligning the forward end of the upper basket with the rear end of the lower basket. However, if more storage space is required, the upper, rear basket may be made larger, and may-be provided with a pivoted rear wall for nesting engagement with the upper basket of another cart for more compact storage.

The carts 10 in the preferred, illustrated embodiment are therefore nestable without requiring any moving parts or requiring the front end of one basket to extend into the rear end of another basket. Because of this, carts can be nested together both with the baskets loaded and unloaded. The loaded nesting arrangement may be used when a shopper needs more than one cart to hold all the items to be purchased.

Figure 4:
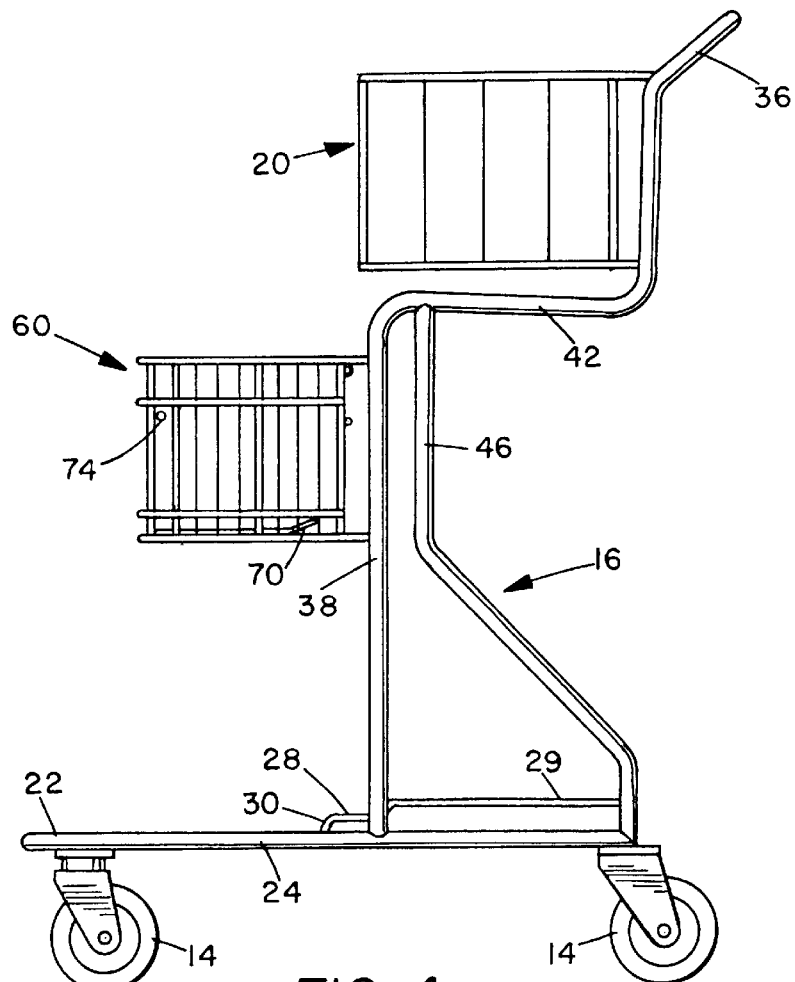
FIG. 4 is a side elevational view of a modified cart.
Figure 5:
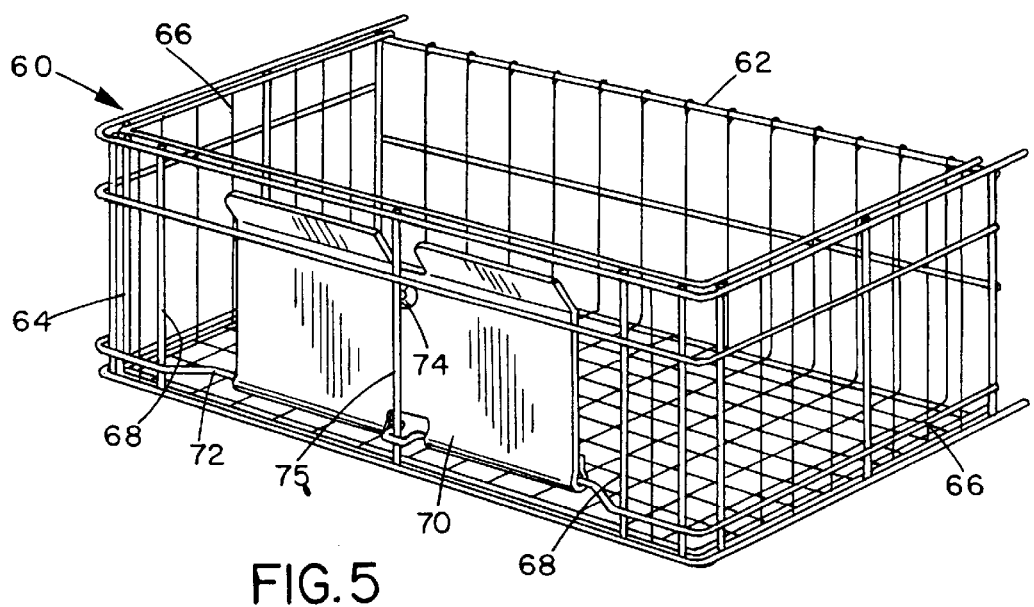
FIG. 5 is an expanded, perspective view of a child seat portion of the cart of FIG. 4.

FIGS. 4 and 5 illustrate a modified cart which is identical to that of the first embodiment except that the lowermost basket 18 of the first embodiment is replaced with a basket 60 which can be modified to provide a forward facing child seat. In an alternative arrangement, the upper basket 20 may instead be replaced with the convertible child seat basket 60, in which case the child will face rearwardly instead of forwardly as in FIG. 4.

The convertible child seating basket 60 is illustrated in more detail in FIG. 5. The basket is of conventional wire mesh construction, with a rear wall 62, front wall 64, and side walls 66. The basket is secured at its rear end to the upright rods 38 on opposite sides of the frame 16, as in the first embodiment. Leg openings 68 are provided in the front wall 64, and a gate or panel member 70 of plastic or the like is pivotally mounted on rod 72 across the lower end of the leg openings 68 for movement between the raised position of FIG. 5, when no child seat is required, and the lowered position of FIG. 4. A suitable snap lock 74 is provided for releasably holding the panel member 70 in the raised position. This may comprise a ball which projects rearwardly from upright wire 75 between the two leg openings, and an opening on the panel for releasable snap engagement over the ball. When the panel is locked in the raised position of FIG. 5, basket 60 may be used conventionally to hold groceries or other items to be purchased. When the panel is lowered as in FIG. 4, the leg openings 68 will be free to receive the legs of a child seated in the basket 60 in a forward facing position, as illustrated in FIG. 4.

The location of a child in a forward facing position as in FIG. 4 may be preferable, since the child will be able to see more, is closer to the ground, and may be less likely to fidget. The child's legs will be protected since the base of the basket projects out beyond the location of the legs and will hit any obstructions before the child's legs will be affected. This version will nest in exactly the same way as the previous embodiment, as illustrated in FIG. 3.

Because there are no moving parts for nesting in either of the above embodiments, and the carts simply nest together without moving or lifting any parts of the forward cart, nesting for storage is much easier, and there is considerably less risk of nested carts jamming together and resisting subsequent separation. Operation of individual carts is much quieter and smoother, and less maintenance will be required.

By providing two level, compartmentalized baskets rather than one large basket, more secure transportation of fragile items can be provided, since these can be kept separate from heavier, more durable items in a different basket. The cart is more compact and easier to maneuver than a conventional one basket cart. Two carts may be used together when more space for items to be purchased is required.

Although a preferred embodiment of the invention has been described above by way of example only, it will be understood by those skilled in the field that modifications may be made to the disclosed embodiment without departing from the scope of the invention, which is defined by the appended claims.

I claim:

1. A shopping cart, comprising:
   a wheeled base having a forward end and a rear end;
   a frame projecting upwardly from the base, the frame having a lower, forward portion and an upper portion stepped rearwardly from the lower portion;
   a first basket projecting forwardly from the lower portion of the frame; and
   a second basket projecting forwardly from the upper portion of the frame;
   each basket having a front wall and a rear wall, and the rear wall of each basket comprising a rigid, non-nestable wall with no moving parts, whereby carts can be nested together by positioning the lower basket of a first cart beneath the upper basket of a second cart with the front wall of the lower basket of the first cart positioned rearwardly of the rear wall of the lower basket of the second cart, and the front wall of the upper basket of the first cart positioned rearwardly of the rear wall of the upper basket of the second cart.

2. The cart as claimed in claim 1, wherein the front wall of the upper basket is substantially aligned with the rear wall of the lower basket.

3. The cart as claimed in claim 1, wherein the upper and lower baskets are of substantially equal length.

4. The cart as claimed in claim 1, wherein the base is fixed with no moving parts, and is stepped and has at least two different levels comprising a forward, lower portion and a rear, raised portion, whereby the forward portion of the base of a first cart can be nested beneath the rear, raised portion of the base of a second cart.

5. The cart as claimed in claim 4, wherein the base has three stepped levels, the forward portion comprising the lowermost level, and an intermediate level being provided between the forward portion and rear portion.

6. The cart as claimed in claim 1, wherein the base has opposite sides and the frame has opposite sides projecting upwardly from the respective opposite sides of the base, each side of the frame comprising at least one support rod, the lower portion of the frame comprising a lower, vertical portion of each support rod projecting upwardly from an intermediate portion of the respective side of the base and spaced forwardly from the rear end of the base, and the upper portion of the frame comprising an upper, vertical portion of each support rod, each support rod having a rearward, horizontal step portion connecting the lower vertical portion to the upper vertical portion.

7. The cart as claimed in claim 6, wherein each side of the frame further comprises a seconds rod projecting upwardly from the rear end of the base, the second rod having an upper end secured to the rearward step portion of said one support rod.

8. The cart as claimed in claim 1, wherein the first basket is convertible to provide a forward-facing child seat.

9. The cart as claimed in claim 8, wherein each basket has a lower wall, the front wall of the first basket has a pair of leg openings, and a panel member is pivotally secured to the first basket for movement between a raised position covering the leg openings and a lowered position nesting on top of the lower wall to provide a child seat.

* * * * *